Dec. 21, 1943. L. YOST 2,337,290

PUMP SHAFT BEARING

Filed March 24, 1941

Lloyd Yost
INVENTOR.

BY *Elvin C. Andrus*
ATTORNEY.

Patented Dec. 21, 1943

2,337,290

UNITED STATES PATENT OFFICE 2,337,290

PUMP SHAFT BEARING

Lloyd Yost, Los Angeles, Calif., assignor to A. O. Smith Corporation, Milwaukee, Wis., a corporation of New York Application March 24, 1941, Serial No. 384,884

5 Claims. (Cl. 308—15)

This invention relates to an improvement in pump shaft bearings, particularly for use in submersible deep well pumping units such as are employed in the pumping of oil wells.

Oil wells have long been pumped with reciprocating pumps operated by sucker rods extending from the surface of the earth to the pump. Increasing depth of wells has led to increasing difficulties with the sucker rod drive and has brought about the development of self contained pumping units placed at the bottom of the well and driven by electrical energy brought to them through an electric cable. The present invention relates to an improvement in such pumping units.

An object of the invention is to provide improved bearings and bearing supports for a rotating shaft extending from the electric motor to the equipment which it drives.

This and other objects of the invention will be clear from the following detailed description and the accompanying drawing in which.

Figure 1:
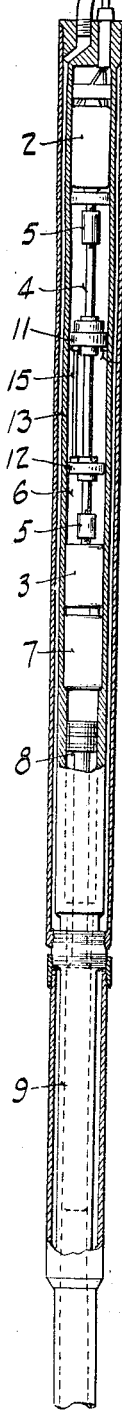
Figure 1 is a schematic diagram illustrating generally the component parts of one kind of a pumping unit in which the invention can be used.
Figure 2:
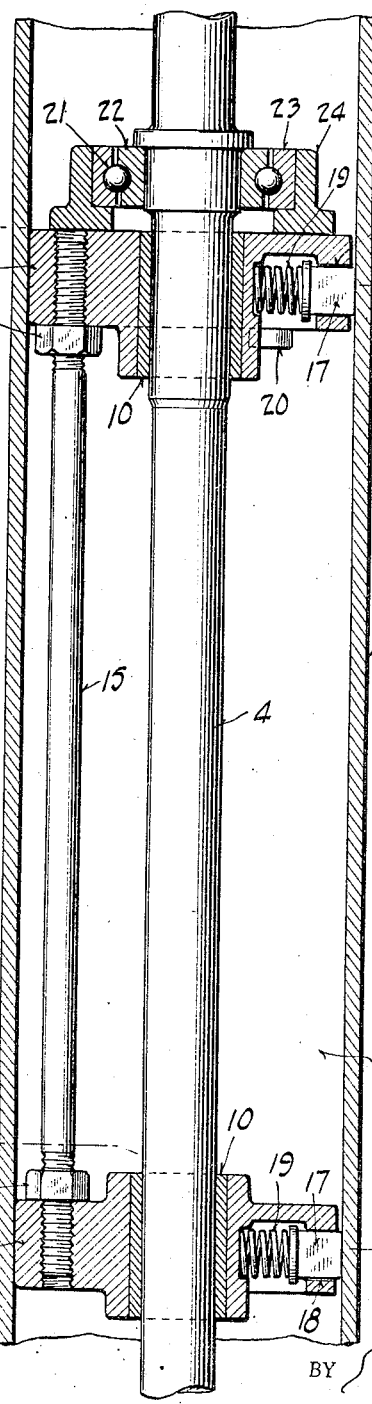
Fig. 2 is an enlarged vertical section on line 2—2 of Fig. 3.

One type of submersible pumping unit in which the present invention has found use is shown schematically in Fig. 1. A casing 1 houses an electric motor 2 which drives a pump 3 by means of shaft 4 connected to the motor and pump by splined couplings 5. The pump 3 takes oil from the oil reservoir 6 in which it is immersed and supplies oil under pressure to a distributing valve 7. The distributing valve controls the flow of pressure oil to a reciprocating hydraulic motor 8 directly connected to a crude oil pump 9 which pumps oil from the well.

The present invention is specifically related to the bearings and bearing supports for the shaft 4 which connects the electric motor 2 to pump 3.

Due to the small diameter of oil wells, the pumping unit must be of small diameter and the oil reservoir 6 of considerable length in order to hold the desired quantity of oil. Difficulty has been experienced in providing satisfactory bearings for the shaft running from the electric motor above the oil reservoir to the pump at its bottom.

The present invention eliminates these difficulties and provides bearings and bearing supports which are easily assembled in the oil reservoir, which take both the radial loads on the shafts and any downward that may be imposed by its own weight and the weight of any other parts it supports, and which insure long continued and satisfactory operation.

Figure 3:
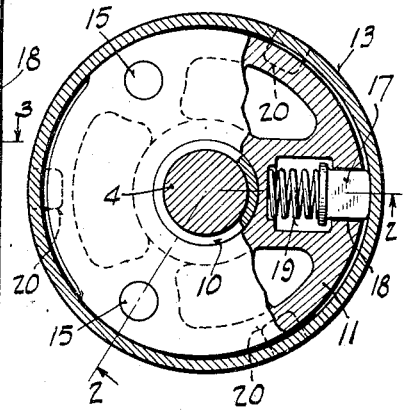
Fig. 3 is a horizontal section on line 3—3 of Fig. 2.
Figure 4:
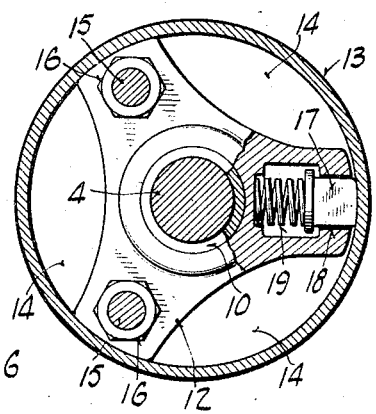
Fig. 4 is a horizontal section on line 4—4 of Fig. 2.

The journal bearings which hold the shaft in alignment may consist of linings 10 of Babbitt or suitable bearing metal held in bearing supports or spiders 11 and 12. The upper bearing support 11 is preferably substantially circular in plan view as shown in Fig. 3 with a diameter slightly less than the internal diameter of tube 13 which forms the oil reservoir, but with the back side cut away just enough to provide a three point engagement with tube 13. The lower bearing support 12 is cut away to leave gaps 14 between it and tube 13, and provide the desired three point engagement with tube 13. The two bearing supports are spaced apart by spacer rods 15 screwed into the supports and locked by lock nuts 16.

Each of the bearing supports is provided with a short plunger 17 which extends through an opening 18 in the side of the support and is pressed outward by a spring 19.

In assembling the structure the two bearing supports are first affixed to the spacer rods 15 which may have right and left hand threads at opposite ends to facilitate this operation. This assembly is then inserted in the upper end of tube 13 and pushed downward until the upper bearing support 11 rests on three abutments 20 secured to tube 13. The springs 19 yield sufficiently to permit the necessary longitudinal movement of the bearing supports, and since the lower support is cut away to leave gaps 14 between it and the tube, it will readily clear the abutments and can be pushed past them. Once arrived at their proper location and held against further longitudinal movement by abutments 20, the bearing supports are centered by springs 19 which are of sufficient stiffness to prevent any play between the bearing supports and the tube in which they are held.

Ordinarily it will be found that the tubing is sufficiently round to insure satisfactory centering of the bearings without any necessity for machining its internal surface. If, however, this is not the case, the inside of the tube can be machined, either over its entire length, or only over the positions where the bearing supports seat. If the latter procedure is followed, tapered entrances to the grooves so formed should be provided in order that the bearing supports will not be locked in position by the plungers 17 but can be withdrawn whenever it is necessary to disassemble the unit.

The downward thrust on the shaft due to its weight and that of any other parts it may support is taken by a ball thrust bearing 21. The inner race 22 is secured to shaft 4, the outer race 23 is supported by the race holder 24. This seats on the upper surface of upper bearing support 11 and is not restrained laterally. Due to the lateral freedom of the race holder, the development of play in the journal bearing due to wear will not impose any radial load upon the thrust bearing. This is an important consideration for when the ball thrust bearing is restrained laterally and forced to take radial as well as thrust loads, its life may be seriously decreased.

While the ball thrust bearing shown in the drawing is of the angular type, it is to be understood that other types of ball thrust bearings may be used if one of the races is free to move laterally to insure that the bearing is not subjected to radial loads.

I claim:

1. In a submersible pumping unit, a tubular member, a bearing support, a plunger mounted in the bearing support to engage the inner surface of the tubular member, a spring to press the plunger outward and hold the bearing support free from lateral play within the tubular member, a journal bearing in the bearing support, a shaft in the journal bearing, and a ball thrust bearing with one race on the shaft and the other race supported on the bearing support so as to be free to move laterally.

2. In a submersible pumping unit, a vertical tubular member, a bearing support, a plunger mounted in the bearing support to engage the inner surface of the tubular member, a spring to press the plunger outward and hold the bearing support free from lateral play within the tubular member, an abutment in the tubular member to restrain the bearing support longitudinally, a second bearing support with a plunger and spring to hold it free from lateral play in the tubular member, spacing means between the two bearing supports to space them longitudinally, a journal bearing carried by each support, a shaft in the journal bearings, and a ball thrust bearing with one race on the shaft and the other race supported on one of the bearing supports so as to be free to move laterally.

3. In a submersible pumping unit, a tubular member, a bearing support therein, a plunger in the bearing support to engage the inner surface of the tubular member, a spring to press the plunger outward and hold the bearing support free from lateral play in the tubular member, a journal bearing carried by the bearing support, a rotary shaft in said journal bearing, and a rolling contact longitudinal thrust bearing supported to be free from radial loads to transfer thrust from the shaft to the bearing support.

4. In a submersible pumping unit, a tubular casing disposed vertically and providing a reservoir for fluid, a motor above the reservoir and having a vertical shaft extending downwardly through the center of said reservoir, a rotary pump at the bottom of said reservoir driven by said motor shaft, and bearings for the motor shaft in said reservoir comprising, a pair of radial bearings, a transverse bearing support for each of said bearings and disposed to engage the walls of the casing to center the bearing therein and hold the bearings in alignment, means securing said bearing supports in fixed spaced relation in said reservoir, and lugs on the inside of the casing for supporting the upper bearing support against downward movement, said bearing support for the lower bearing having grooves in its outer surface providing for the passing of the lugs by said lower support when the support is inserted from above and for the passage of fluid in said reservoir.

5. In a submersible pumping unit, a tubular casing disposed vertically and providing a reservoir for fluid, a motor above the reservoir and having a vertical shaft extending downwardly through the center of said reservoir, a rotary pump at the bottom of said reservoir driven by said motor shaft, and a bearing for the motor shaft in said reservoir comprising, a transverse bearing support disposed to resiliently engage the walls of the casing to center the bearing therein, a radial bearing for said shaft in said support, a longitudinal thrust bearing for said shaft mounted on said support and free to move laterally relative thereto, and means for holding said bearing support against longitudinal movement relative to said tubular casing.

LLOYD YOST.